United States Patent
Zhang et al.

(10) Patent No.: US 11,627,384 B2
(45) Date of Patent: Apr. 11, 2023

(54) MULTI-LENS CAMERA MODULE CONJOINED STAND, MULTI-LENS CAMERA MODULE AND APPLICATION THEREOF

(71) Applicant: Ningbo Sunny Opotech Co., Ltd., Zhejiang (CN)

(72) Inventors: Kouwen Zhang, Ningbo (CN); Keqiang Xiong, Ningbo (CN); Bojie Zhao, Ningbo (CN); Mingzhu Wang, Ningbo (CN)

(73) Assignee: NINGBO SUNNY OPOTECH CO., LTD., Zhejiang (CN)

( * ) Notice: Subject to any disclaimer, the term of this patent is extended or adjusted under 35 U.S.C. 154(b) by 1236 days.

(21) Appl. No.: 15/750,200

(22) PCT Filed: Jul. 26, 2016

(86) PCT No.: PCT/CN2016/091714
§ 371 (c)(1),
(2) Date: May 25, 2018

(87) PCT Pub. No.: WO2017/020751
PCT Pub. Date: Feb. 9, 2017

(65) Prior Publication Data
US 2021/0329149 A1    Oct. 21, 2021

(30) Foreign Application Priority Data

Aug. 4, 2015   (CN) .......................... 201510472665.7

(51) Int. Cl.
*H04N 5/335*   (2011.01)
*H04N 23/55*   (2023.01)
(Continued)

(52) U.S. Cl.
CPC ............. *H04N 23/55* (2023.01); *G03B 11/00* (2013.01); *G03B 17/12* (2013.01); *H04N 23/45* (2023.01); *H04N 23/54* (2023.01)

(58) Field of Classification Search
CPC ................................. G03B 17/12; G03B 11/00
See application file for complete search history.

(56) References Cited

U.S. PATENT DOCUMENTS 9,933,601 B2 *   4/2018   Shi ...................... G02B 13/0085
9,973,669 B2 *   5/2018   Vittu .................... H04N 5/2253
(Continued)

FOREIGN PATENT DOCUMENTS

CN    102573277    7/2012
CN    202652361    1/2013
(Continued)

*Primary Examiner* — Gary C Vieaux
(74) *Attorney, Agent, or Firm* — Wenderoth, Lind & Ponack, L.L.P.

(57) ABSTRACT

A multi-lens camera module and its multi-lens camera module conjoined stand, and the application thereof. The multi-lens camera module includes at least two lens assemblies, at least two photosensitive assemblies and an integrated multi-lens camera module conjoined stand. The multi-lens camera module conjoined stand has an upside and a downside. Each lens assembly is connected to the upside of the multi-lens camera module conjoined stand. Each photosensitive assembly is connected to the downside of the multi-lens camera module conjoined stand. Each of the camera assembly is located along a path of photoreception of the respective photosensitive assembly. By this means, technical defects in the conventional art, including positional deviations and angle deviations among stands when separate stands are connected, can be avoided. Therefore, the imaging quality of the multi-lens camera module is improved.

26 Claims, 10 Drawing Sheets

(51) Int. Cl.
*G03B 11/00* (2021.01)
*G03B 17/12* (2021.01)
*H04N 23/45* (2023.01)
*H04N 23/54* (2023.01)

(56) References Cited

U.S. PATENT DOCUMENTS

| | | | |
|---|---|---|---|
| 2008/0304821 A1 | 12/2008 | Jeung et al. | |
| 2010/0166410 A1* | 7/2010 | Chang | G03B 35/00 396/326 |
| 2010/0259655 A1* | 10/2010 | Takayama | H04N 5/2254 348/262 |
| 2012/0086784 A1* | 4/2012 | Oh | G03B 35/08 348/47 |
| 2013/0141541 A1* | 6/2013 | Jung | G03B 35/08 348/46 |
| 2013/0201391 A1* | 8/2013 | Ogasahara | H04N 5/2258 348/374 |
| 2014/0326855 A1* | 11/2014 | Lu | G02B 13/0085 250/208.1 |
| 2015/0054001 A1* | 2/2015 | Oganesian | H04N 5/2258 257/82 |
| 2015/0122411 A1* | 5/2015 | Rodda | H01L 27/14621 156/252 |
| 2015/0138424 A1* | 5/2015 | Dobashi | H04N 5/2254 348/340 |
| 2015/0201128 A1* | 7/2015 | Dong | H04N 5/2253 348/208.11 |
| 2018/0376123 A1* | 12/2018 | Rendlen | H04N 5/2252 |

FOREIGN PATENT DOCUMENTS

| | | |
|---|---|---|
| CN | 103336401 | 10/2013 |
| CN | 203416328 | 1/2014 |
| CN | 203788359 | 8/2014 |
| CN | 203933331 | 11/2014 |
| CN | 104349030 | 2/2015 |
| CN | 204422842 | 6/2015 |
| CN | 104834158 | 8/2015 |
| CN | 204633900 | 9/2015 |
| CN | 105187697 | 12/2015 |
| CN | 204948203 | 1/2016 |
| CN | 204993579 | 1/2016 |
| EP | 3334145 | 6/2018 |
| JP | 2004-48287 | 2/2004 |
| JP | 2007-036393 | 2/2007 |
| JP | 2007-306282 | 11/2007 |
| JP | 2008-304911 | 12/2008 |
| JP | 2011-237623 | 11/2011 |
| JP | 2016-36137 | 3/2016 |

* cited by examiner integrally forming a multi-lens camera module conjoined stand 10 respectively connecting each lens assembly 20 and each photosensitive assembly 30 with the upside and the downside of the multi-lens camera module 10, wherein each lens assembly 20 is located along the path of photoreception of each photosensitive assembly 30 respectively

Fig.10

MULTI-LENS CAMERA MODULE CONJOINED STAND, MULTI-LENS CAMERA MODULE AND APPLICATION THEREOF

CROSS REFERENCE OF RELATED APPLICATION

This is a U.S. National Stage under 35 U.S.C. 371 of the International Application Number PCT/CN2016/091714, filed Jul. 26, 2016, which claims priority under 35 U.S.C. 119(a-d) to Chinese application number 2015104726657, filed Aug. 4, 2015. The afore-mentioned patent applications are hereby incorporated by reference in their entireties.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a multi-lens optical imaging device, and more particularly to a multi-lens camera module and its multi-lens camera module conjoined stand and the application thereof.

Description of Related Arts

Nowadays, electronic products mostly tend to integrate more functions. This trend stimulates the creation of multi-functional products. For example, cellphone has evolved from the original communication device into a highly integrated mobile electronic device with diverse and multidimensional functions, such as communication, photography, internet, navigation, and etc.

In recent years, along with the invention and popularization of social networking APPs, such as WeChat, Whatsapp and etc., of mobile electronic devices, a new communication pattern among people has emerged. For example, WeChat provides a Group of Friends function that allows the user to publish images like pictures, videos, and etc. taken by the camera module that is arranged on the mobile electronic device, so that the user's friends may comment or like the posted content. This type of behavior has changed the communication pattern among people to a great extent and boosted information transmission and exchange among people. Nevertheless, the camera modules arranged on mobile electronic devices are mostly single lens camera modules currently, which can no longer satisfy user's demand on image quality and effect of the image shot by mobile electronic devices.

On the other hand, camera modules with two or more lenses, such as dual-lens camera module, has been created and become more and more popular. Dual-lens camera module provides shooting means that imitates the structure of human eyes. Besides, it has more excellent performance on various approaches, such as 3D photography shooting and scanning, hand sign and motion recognition, color naturalness, fast focusing, deep panorama photography, bokeh photography, and etc. Therefore, camera module with two or more lenses should be a critical trend of development for camera module industry. During the image shooting process, the dual-lens camera module utilizes two image modules that are spatially different to respectively obtain an image from two positions and composites with the images shot by these two image modules through an image composition method, so as to obtain a final image of the multi-lens camera module. It is understandable that the consistency of the image effects, including resolution, shading, color, and etc., of each image module of the multi-lens camera module and the deviations in the horizontal, vertical, and longitudinal directions thereof are important indicators to measure the imaging quality of the dual-lens camera module.

Unfortunately, both the manufacturing and assembling technology and the final structure of the dual-lens camera module are far from ensuring the imaging quality of the dual-lens camera module currently. FIG. 1 illustrated a conventional dual-lens camera module, which includes a circuit board 10P, two stands 20P, and two imaging modules 30P. Each imaging module 30P includes a motor lens assembly 31P. Each stand 20P is independently provided on the same side of the circuit board 10P. The stands 20P are connected by the circuit board 10P. Each lens assembly 31P is respectively arranged on the respective stand 20P so as to be supported thereby. It is understandable that based on the assembly technology of the conventional dual-lens camera module, each stand 20P is independently attached on the circuit board 10P, which causes difficulties of controlling the dimensions, positions, and etc. between the stands 20P. As a result, the consistencies of the parameters of the dimensions, positions, and etc. between the stands 20P are relatively poor.

Based on the structure of the conventional dual-lens camera module, every stand 20P is independent and the stands 20P are connected only by the circuit board 10P. Because the circuit board 10P is usually chosen to be a PCB circuit board, it is soft and easy to be deformed. Consequently, the overall rigidity of the dual-lens camera module can hardly be guaranteed. When the conventional dual-lens camera module is produced and utilized, such conventional structure can cause uncertain and inconsistent dimensions and large positional tolerance among all the elements of the imaging modules 30P, such as the lens assemblies 31P and etc. Moreover, the optic axes of the imaging modules 30P can easily deviate from the designated positions. Once any of the above has occurred, there will be uncontrollable factors or relatively big adverse impact to the imaging quality, such as the final imaging result of the image synthesis and etc., of the conventional dual-lens camera module. If the stands 20P are positioned through the way of attaching reinforcing element on a side of the circuit board 10P, it will increase the thickness of the dual-lens camera module, which should not be an ideal solution.

Besides, when the dual-lens camera module is in use, the imaging modules 30P will produce plenty of heat. The accumulation of heat can heat up the circuit board 10P and cause deformation. If the circuit board 10P deforms, the assembling positions of the stands 20P that are independently attached on the circuit board 10P will be forced to change relatively. Consequently, the positions of the imaging modules 30P supported by the stands 20P will also be changed at the same time, which brings incalculable consequence to the conventional dual-lens camera module.

SUMMARY OF THE PRESENT INVENTION

An object of the present invention is to provide a multi-lens camera module and its multi-lens module conjoined stand, and the application thereof, wherein the multi-lens camera module comprises an integrated multi-lens camera module conjoined stand, at least two lens assemblies, and at least two photosensitive assemblies, wherein the multi-lens camera module conjoined stand supports the lens assemblies and the photosensitive assemblies, wherein the integrated multi-lens camera module conjoined stand can avoid tilt relatively between the paths of photoreception of the lens assemblies, so as to ensure the consistency of the multi-lens camera module.

Another object of the present invention is to provide a multi-lens camera module and its multi-lens camera module conjoined stand, and the application thereof, wherein the integrated multi-lens camera module conjoined stand does not require to connect independent stands together, such that the multi-lens camera module conjoined stand can avoid positional tolerance from occurring between the adjacent lens assemblies, which can help to enhance the imaging quality of the multi-lens camera module.

Another object of the present invention is to provide a multi-lens camera module conjoined stand, multi-lens camera module and application thereof, wherein the integrated multi-lens camera module conjoined stand does not require to be connect by other element, such as circuit board and etc., such that when the multi-lens camera module conjoined stand is utilized to assemble the multi-lens camera module and during the transportation and application of the multi-lens camera module, the multi-lens camera module conjoined stand will not be deformed accordingly so as to ensure t the imaging quality of the multi-lens camera module.

Another object of the present invention is to provide a multi-lens camera module and its multi-lens camera module conjoined stand, and the application thereof, wherein the photosensitive assembly provide a circuit board that does not have to be utilized for connecting independent stands, such that the circuit board is capable of being integrated in a photosensitive sensor or being made with a thinner size. For example, the circuit board can be a FPC circuit board. Accordingly, it can reduce the thickness of the multi-lens camera module and then allow the multi-lens camera module to be utilized in more compact mobile electronics.

Another object of the present invention is to provide a multi-lens camera module conjoined stand, multi-lens camera module and application thereof, wherein the integrated multi-lens camera module conjoined stand does not require to connect two or more independent stands together during the assembling process of the multi-lens camera module, that simplifies the assembling steps of the multi-lens camera module and increases the assembling efficiency of the multi-lens camera module.

Another object of the present invention is to provide a multi-lens camera module conjoined stand, multi-lens camera module and application thereof, wherein the multi-lens camera module conjoined stand comprises a connecting body and two stand bodies, wherein the stand bodies are integrally extended from two sides of the connecting body respectively while each of the stand bodies is adapted for being connected with one of the lens assemblies and one of the photosensitive assemblies, wherein the multi-lens camera module conjoined stand can ensure the central axis lines of the stand bodies being parallel to each other, so as to avoid tilt from occurring between the paths of photoreception of adjacent lens assemblies.

Another object of the present invention is to provide a multi-lens camera module conjoined stand, multi-lens camera module and application thereof, wherein the multi-lens camera module conjoined stand prevents the photosensitive sensors of the photosensitive assemblies from being in the same packaging space with other electronic components during the assembling process of the multi-lens camera module, so as to avoid the photosensitive sides of the photosensitive sensors from being polluted by welding slag, dust, and etc. dropped from the surfaces of the electronic components, that helps to avoid defective pixel from occurring on the photosensitive sides of the photosensitive sensors.

In order to achieve the above and other objects, the present invention provides a multi-lens camera module, comprising at least two lens assemblies;

at least two photosensitive assemblies; and an integrated multi-lens camera module conjoined stand having an upside and a downside, wherein each of the lens assemblies is connected with the upside of the multi-lens camera module conjoined stand and each of the photosensitive assemblies is respectively connected with the downside of the multi-lens camera module conjoined stand, wherein the camera assemblies are located along paths of photoreception of the photosensitive assemblies respectively.

According to a preferred embodiment of the present invention, the multi-lens camera module conjoined stand comprises at least one connecting body and at least two stand bodies, wherein each of the stand bodies is extended from one of the at least one connecting body, wherein the stand bodies support the lens assemblies and the photosensitive assemblies respectively.

According to a preferred embodiment of the present invention, the multi-lens camera module conjoined stand comprises one connecting body and two stand bodies, wherein the stand bodies are symmetrically and integrally extended from the connecting body.

According to a preferred embodiment of the present invention, a least one of the stand bodies has a light channel, a first packaging groove and a second packaging groove respectively communicated with the light channel, wherein the lens assembly is corresponding to the first packaging groove and connected with the upside of the multi-lens camera module conjoined stand, wherein the photosensitive assembly is corresponding to the second packaging groove and connected with the downside of the multi-lens camera module conjoined stand.

According to a preferred embodiment of the present invention, the multi-lens camera module conjoined stand has at least two light channels, at least two first packaging grooves and at least two second packaging grooves, wherein each of the first packaging grooves and each of the second packaging grooves are respectively communicated with one of the at least two light channels, wherein the lens assembly is corresponding to the first packaging groove and connected with the upside of the multi-lens camera module conjoined stand, wherein the photosensitive assembly is corresponding to the second packaging groove and connected with the downside of the multi-lens camera module conjoined stand.

According to a preferred embodiment of the present invention, at least one of the connecting bodies comprises a connecting portion and an attaching portion, wherein the attaching portion is extended from the stand body and the connecting portion is extended from the inner side of the attaching portion, wherein the thickness dimension of the connecting portion is smaller than the thickness dimension of the attaching portion, so as to respectively form the first packaging groove and the second packaging groove on the two side portions of the connecting portion along the thickness direction of the multi-lens camera module.

According to a preferred embodiment of the present invention, at least one of the stand bodies comprises a loading portion extended from the inner side of the connecting portion, wherein the loading portion defines the light channel, wherein the thickness dimension of the loading portion is smaller than the thickness dimension of the connecting portion, so as to form a stair on the side of the connecting portion along the thickness direction of the multi-lens camera module.

According to a preferred embodiment of the present invention, the multi-lens camera module further comprises at least two filtering elements arranged on the stairs formed by the loading portions respectively.

According to a preferred embodiment of the present invention, the stair and the first packaging groove are on the same side of the multi-lens camera module conjoined stand.

According to a preferred embodiment of the present invention, the stair and the second packaging groove are on the same side of the multi-lens camera module conjoined stand.

According to a preferred embodiment of the present invention, the at least one connecting body comprises an electronic component accommodating cavity arranged thereon, wherein the electronic component accommodating cavity is impassable to the first packaging groove, the second packaging groove and the light channel, wherein each the photosensitive assembly comprises a circuit board and a sensor electrically connected with the circuit board, wherein the circuit board comprises an electronic component and is adaptable for being attached on the downside of one the multi-lens camera module conjoined stand, wherein the photosensitive sensor is packaged and sealed in the second packaging groove and the electronic component is packaged and sealed in the electronic component accommodating cavity.

According to a preferred embodiment of the present invention, the electronic component accommodating cavity and the second packaging groove are on the same side of the multi-lens camera module conjoined stand.

According to a preferred embodiment of the present invention, the circuit board is a PCB circuit board or a FPC circuit board.

According to a preferred embodiment of the present invention, the alignment of the central axes of the stand bodies is parallel or vertical to the peripheral of the multi-lens camera module conjoined stand.

According to a preferred embodiment of the present invention, the range of the distance between the central axes of the stand bodies is 5 mm-200 mm.

According to a preferred embodiment of the present invention, the range of the distance between the central axes of the stand bodies is 9 mm.

According to a preferred embodiment of the present invention, the material of the multi-lens camera module conjoined stand is selected from the group consisting of thermoplastic resin, engineering plastics, metal, and alloy.

According to a preferred embodiment of the present invention, the material of the multi-lens camera module conjoined stand is aluminum alloy or zinc alloy.

According to a preferred embodiment of the present invention, the material of the multi-lens camera module conjoined stand is metal powder or mixture of metal powder and nonmetal powder.

According to another aspect of the present invention, the present invention also provides a multi-lens camera module conjoined stand for connecting with at least two lens assemblies and at least two photosensitive assemblies, wherein the multi-lens camera module conjoined stand is integrally formed.

According to a preferred embodiment of the present invention, each of the stand bodies comprises an attaching portion, a connecting portion and a loading portion, wherein the attaching portion is extended from the connecting body and the connecting portion is connected with the attaching portion and the loading portion, wherein the loading portion comprises a light channel arranged therein.

According to a preferred embodiment of the present invention, the thickness dimension of the loading portion is smaller than the thickness dimension of the connecting portion so as to form a stair on the side of the connecting portion along the thickness direction of the multi-lens camera module conjoined stand.

According to a preferred embodiment of the present invention, the thickness dimension of the connecting portion is smaller than the thickness dimension of the attaching portion so as to form a first packaging groove and a second packaging groove on the two side portions of the connecting portion respectively along the thickness direction of the multi-lens camera module conjoined stand, wherein the first packaging groove and the second packaging groove are respectively communicated with the light channel.

According to another aspect of the present invention, the present invention also provides a method for avoiding two or more lens assemblies and two or more photosensitive assemblies of a multi-lens camera module from deviation, wherein the method comprises the following steps:

(a) integrally forming a multi-lens camera module conjoined stand; and (b) connecting each of the lens assemblies and each of the photosensitive assemblies with the upside and the downside of the multi-lens camera module respectively, wherein each lens assembly is located along the path of photoreception of each photosensitive assembly respectively.

According to a preferred embodiment of the present invention, the multi-lens camera module conjoined stand comprises at least one connecting body and at least two stand bodies, wherein each the stand body is extended from at least one of the connecting body, wherein the stand bodies support the lens assemblies and the photosensitive assemblies respectively. According to a preferred embodiment of the present invention, the multi-lens camera module conjoined stand comprises one connecting body and two stand bodies, wherein the stand bodies are symmetrically and integrally extended from the connecting body.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 10 is a flow chart illustrating a method for avoiding the imaging module of a multi-lens camera module from having deviation according to the preferred embodiment of the present invention.

DETAILED DESCRIPTION OF THE PREFERRED EMBODIMENT

The following details of the present invention are disclosed with the drawings and one or more embodiments in order that those skilled in the art can manufacture and utilize the present invention. Preferred embodiments in the following descriptions are to give examples only. Those skilled in the art can think of other obvious modifications. The basic notions defined in the following descriptions can apply to other implementations, substitutes, modifications, equivalences, and applications that do not deviate from the scope or spirit of the present invention.

Referring to FIGS. 2-5B, a multi-lens camera module according to a preferred embodiment of the present invention is illustrated, wherein the multi-lens camera module can be utilized in various electronic devices, so as to assist the user to shoot image of objects or persons through the multi-lens camera module. For example, the multi-lens camera module can be utilized to shoot imaging information, such as picture or video of objects, persons, and etc. Preferably, the multi-lens camera module can be utilized in a mobile electronic device, which can be, for example but not limited to, a mobile phone or tablet.

Figure 1:
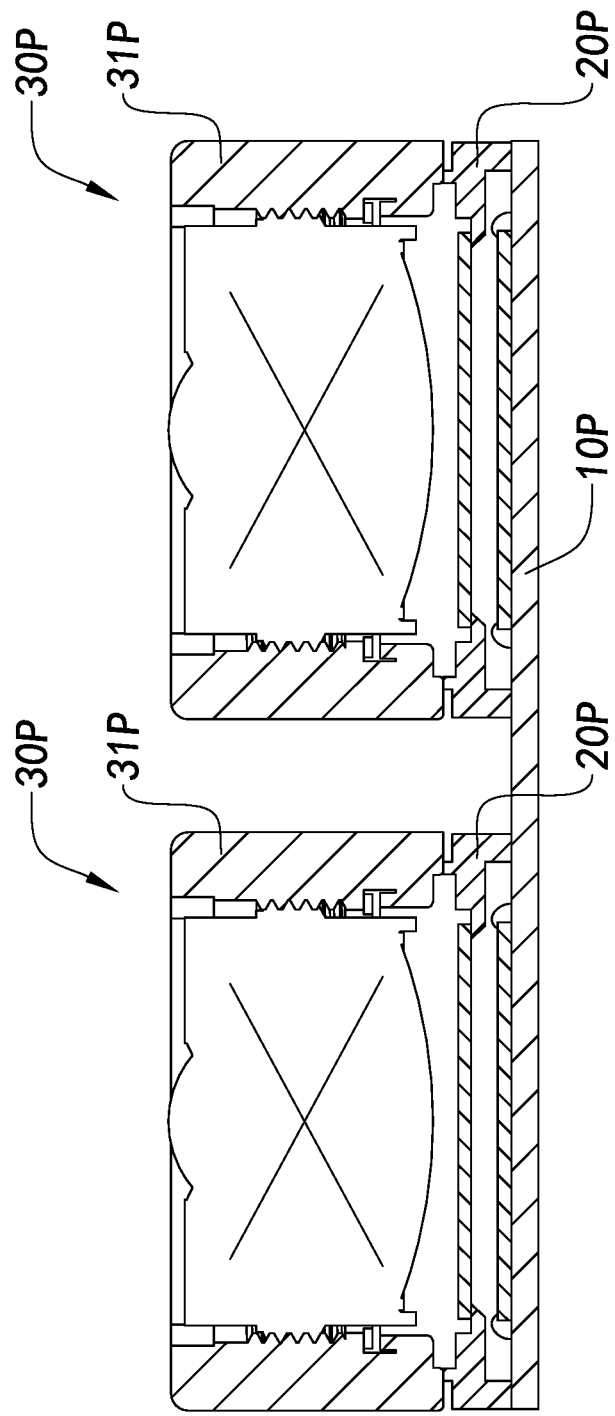
FIG. 1 is a sectional view of a conventional dual-lens camera module.
Figure 2:
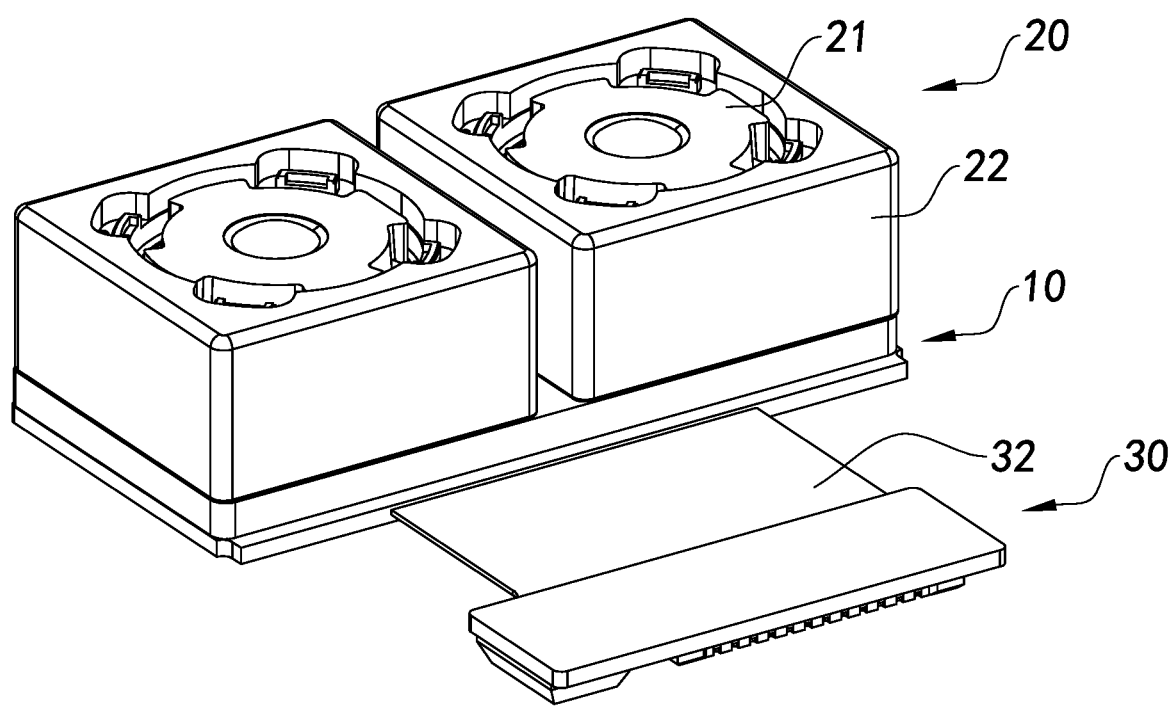
FIG. 2 is a perspective view of a multi-lens camera module according to a preferred embodiment of the present invention.
Figure 3:
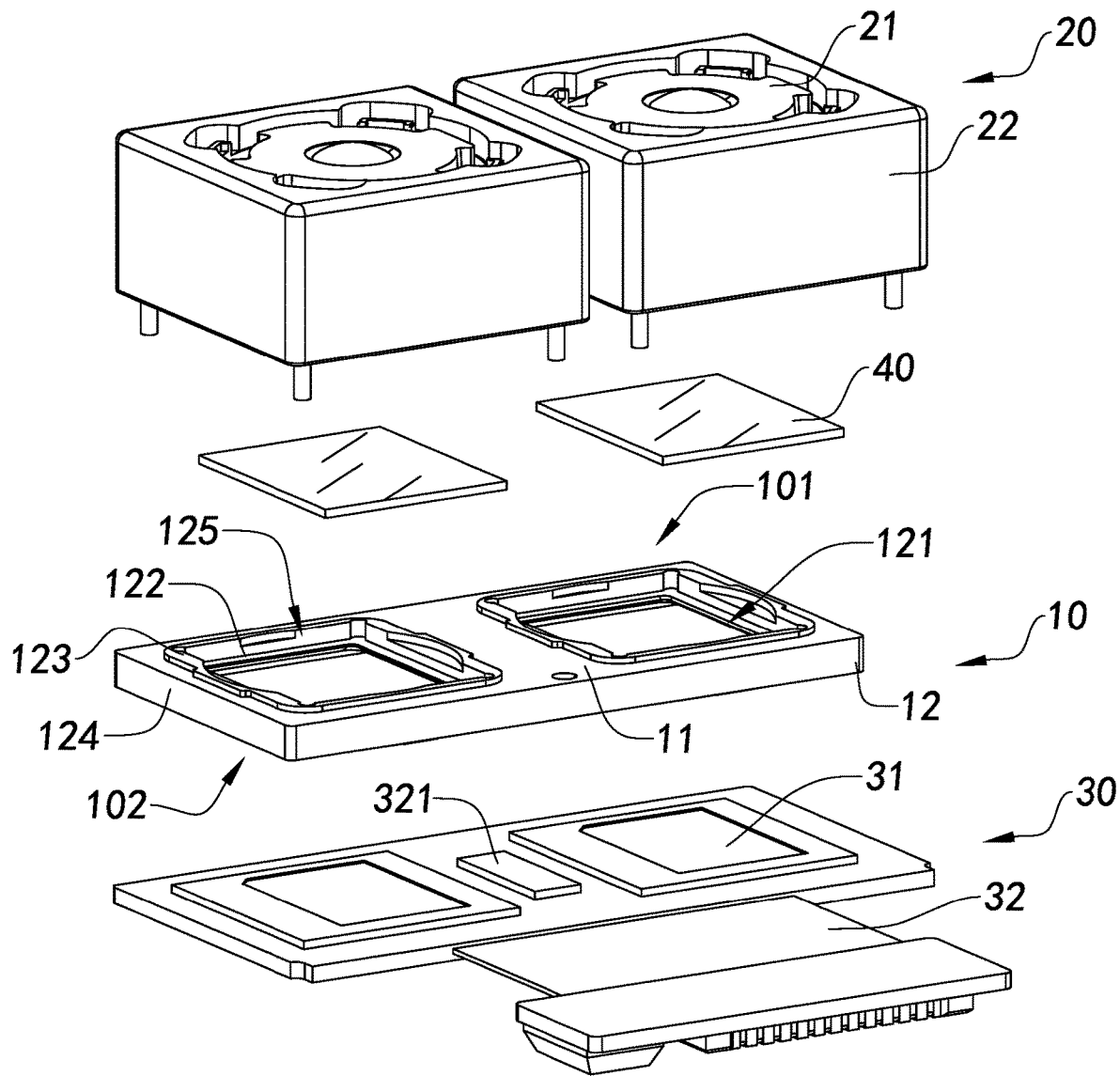
FIG. 3 is an exploded view of the multi-lens camera module according to the above preferred embodiment of the present invention.
Figure 4:
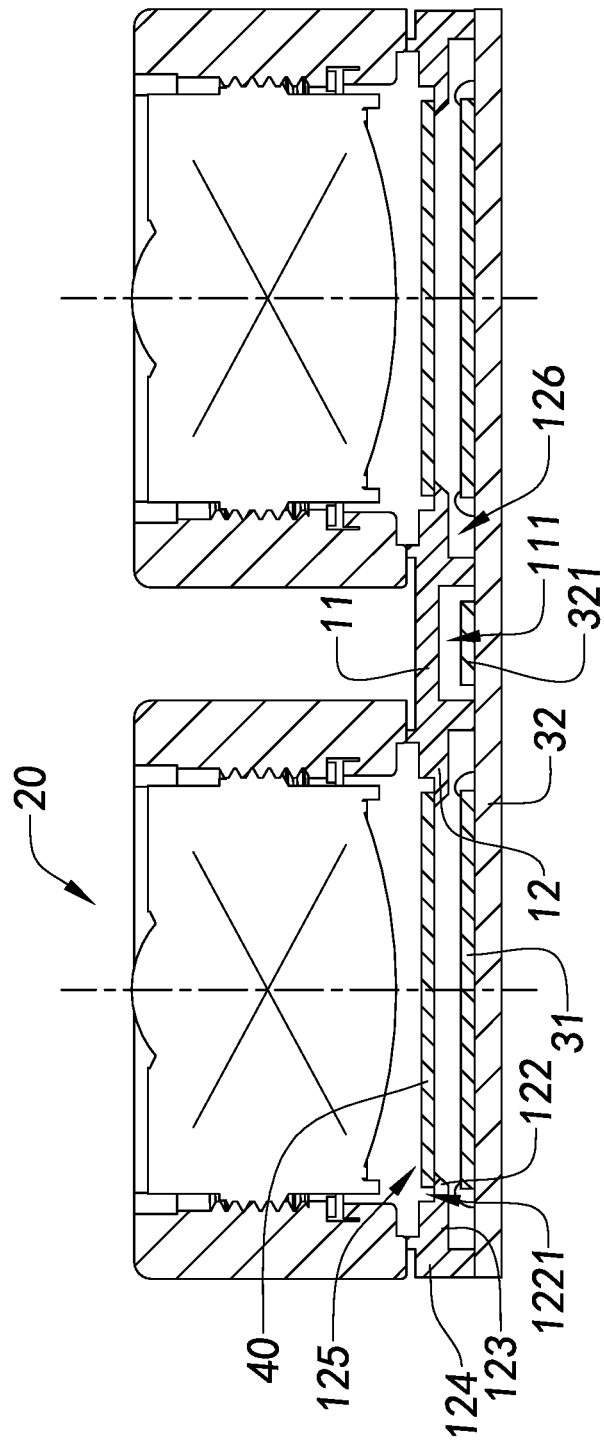
FIG. 4 is a sectional view of the multi-lens camera module according to the above preferred embodiment of the present invention.
Figure 5A:
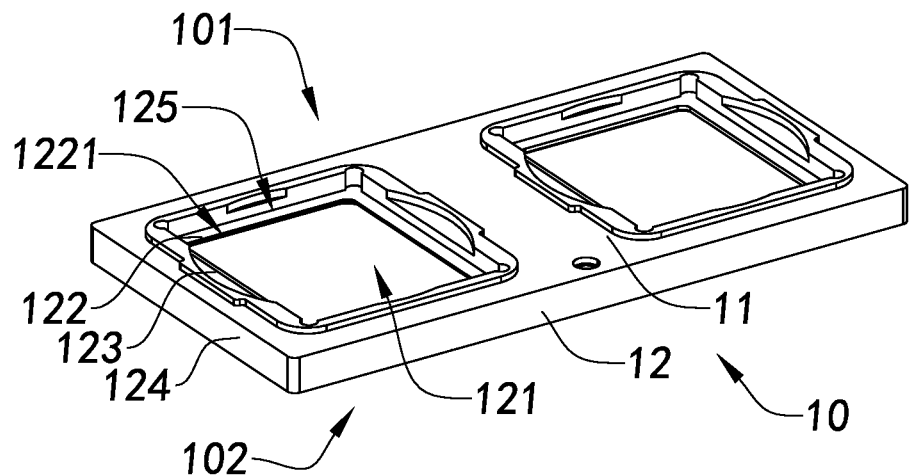
FIG. 5A is a perspective view at a visual angle of the multi-lens camera module conjoined stand according to the above preferred embodiment of the present invention.
Figure 5B:
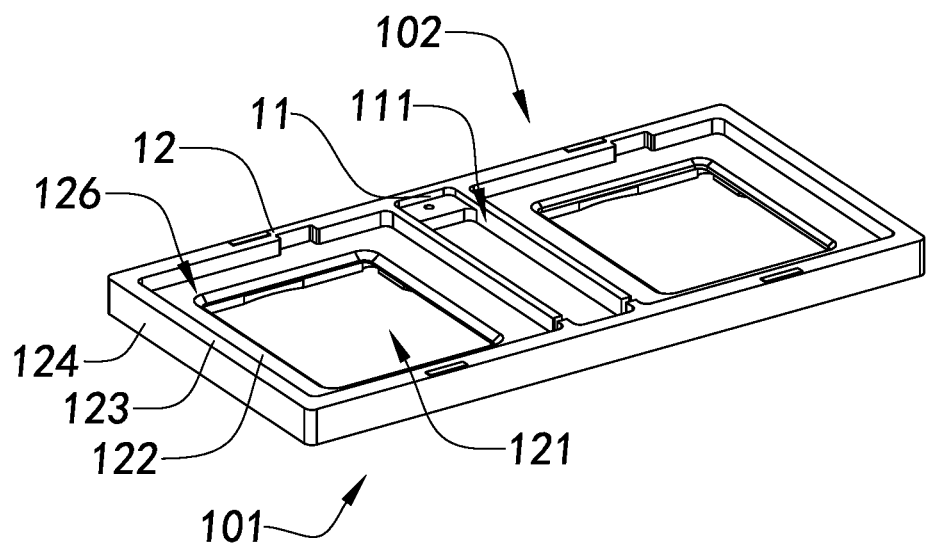
FIG. 5B is a perspective view at another visual angle of the multi-lens camera module conjoined stand according to the above preferred embodiment of the present invention.

Referring to FIGS. 2 and 3, the multi-lens camera module of the present invention is embodied as a dual-lens camera module in the following description to give examples for illustrating contents and advantages of the present invention. In particular, the dual-lens camera module can comprise a multi-lens camera module conjoined stand 10, at least two lens assemblies 20, and at least two photosensitive assemblies 30. The lens assemblies 20 and the photosensitive assemblies 30 are connected to different sides of the multi-lens camera module conjoined stand 10 respectively. Each of the lens assemblies 20 is positioned corresponding to a path of photoreception of one of the photosensitive assemblies 30 so as to be arranged in a one-on-one manner. Besides, the photosensitive assemblies 30 can be coupled with the electronic device. Person skilled in the art should understand that one of the lens assemblies 20 paired with one of the photosensitive assemblies 30 can coordinate for capturing image. Specifically, light reflected from objects or persons and passed through the lens assemblies 20 will respectively be received by the photosensitive assemblies 30 for photoelectric conversion. That is to say, the photosensitive assemblies 30 can convert light signals into electrical signals and the electrical signals can be sent to the electronic device through the photosensitive assemblies 30, so as for the electronic device to generate relative image of the objects or persons therefor.

The multi-lens camera module conjoined stand 10 has an upside 101 and a downside 102. The upside 101 and the downside 102 of the multi-lens camera module conjoined stand 10 are opposite to each other. Each lens assembly 20 is connected with the upside 101 of the multi-lens camera module conjoined stand 10. Each photosensitive assembly 30 is connected with the downside 102 of the multi-lens camera module conjoined stand 10. It is worth mentioning that, referring to FIG. 4, the side of the dual-lens camera module that is closer to the objects or persons being shot is defined as the upside 101 of the multi-lens camera module conjoined stand 10. Oppositely, the side of the dual-lens camera module that is away from the objects or persons being shot is defined as the downside 102 of the multi-lens camera module conjoined stand 10. Therefore, it is understandable that when the dual-lens camera module is utilized in a mobile electronic device, such as mobile phone, digital camera and etc., and held on the user's hand, the upside 101 and the downside 102 of the multi-lens camera module conjoined stand 10 may have a front and back relationship rather than an up and down relationship in terms of spatial position.

According to the preferred embodiment, the multi-lens camera module conjoined stand 10 comprises a connecting body 11 and two stand bodies 12, wherein the stand bodies 12 are integrally extended from the connecting body 11, wherein each of the stand bodies 12 is utilized to support one of the lens assemblies 20 and one of the photosensitive assemblies 30. Person skilled in the art should understand that, for the dual-lens camera module of the present invention, the connecting body 11 of the multi-lens camera module conjoined stand 10 and the stand bodies 12 are integrally formed, such that the multi-lens camera module conjoined stand 10 provided by the present invention is an integral body that can overcome the technical defects in the prior art, such as positional deviations and angle deviations between two independent stands, wherein the two separating stands are connected together by means of another element such as the circuit board. Moreover, the multi-lens camera module conjoined stand 10 can avoid relative tilt between the paths of photoreception of the lens assemblies 20 and the photosensitive assemblies 30, so as to guarantee the consistency and imaging quality of the dual-lens camera module.

According to a preferred implementation of the present invention, each of the lens assemblies 20 can comprise an optical lens 21 directly connected on one of the stand bodies 12 of the multi-lens camera module conjoined stand 10. In other words, according to this implementation, the lens assembly 20 is a fixed focus lens assembly, which means the focal length of the lens assembly 20 cannot be freely adjusted. Person skilled in the art should understand that the optical lens 21 illustrated in the present invention can be directly connected with the stand body 12, which includes connecting the optical lens 21 with the stand body 12 through a shell.

Besides, according to another preferred implementation of the present invention, each of the lens assemblies 20 can also comprise a driving motor 22 connected with the stand body 12 of the multi-lens camera module conjoined stand 10. Each optical lens 21 is drivably connected with the driving motor 22, such that the driving motor 22 can drive the optical lens 21 to move along the path of photoreception of the photosensitive assembly 30, so as to adjust the focal length of the lens assembly 20. That is to say, according to this implementation, the lens assemblies 20 are zoom lens assemblies, which mean the focal lengths of the lens assemblies 20 are adjustable. For instance, if a user is utilizing the dual-lens camera module to shoot image, he may adjust the shooting result through adjusting the focal lengths of the lens assemblies 20.

In addition, each of the photosensitive assemblies 30 can comprise a photosensitive sensor 31. The photosensitive side of the photosensitive sensor 31 is facing the optical lens 21 of the lens assembly 20 and an optic axis of the optical lens 21 is perpendicular to the photosensitive side of the photosensitive sensor 31, such that after the light passes through the optical lens 21, the light can be received by the photosensitive side of the photosensitive sensor 31 for subsequent photoelectric conversion. According to a preferred implementation of the present invention, the circuit of each photosensitive assembly 30 can be arranged on the photosensitive sensor 31 and each photosensitive assembly 30 is coupled with the electronic device through the circuit.

According to another preferred implementation of the present invention, the photosensitive assembly 30 may also comprise a circuit board 32, wherein each photosensitive sensor 31 can be electrically connected with the circuit board 32. The circuit board 32 is coupled with the electronic device, such that the circuit board 32 can be utilized to send the electrical signal generated by the photosensitive sensor 31 through photoelectric conversion to the electronic device. For instance, the photosensitive sensor 31 can be electrically connected to the circuit board 32 by being attached on different positions of the circuit board 32.

Besides, when sealing and packaging the dual-lens camera module, the circuit board 32 is connected on the multi-lens camera module conjoined stand 10 and the photosensitive sensors 31 are corresponded to the stand bodies 12 respectively. For an exemplar illustration, after the photosensitive sensor 31 was attached on the circuit board 32, it can be electrically connected with the circuit board 32 through at least a wire bond. Specifically, the dual-lens camera module provides at least a wire bond. The two ends of the wire bond are respectively extended to connect with the fringe of the photosensitive sensor 31 and the circuit board 32, so as to achieve the electrical connection between the photosensitive sensor 31 and the circuit board 32. Nevertheless, person skilled in the art should understand that the wire bond should not be the only feasible implementation for electrically connecting the photosensitive sensor 31 and the circuit board 32. For example, according to another feasible implementation of the present invention, the photosensitive sensor 31 and the circuit board 32 can also be welded and solder the solder balls. It is worth mentioning that, according to the dual-lens camera module of the present invention, the connection mode of the sensor 31 and the circuit board 32 shall not limit the content and scope of the present invention.

It is worth mentioning that the lens assemblies 20 of the dual-lens camera module can both be zoom lens assemblies. In other words, when the lens assemblies 20 and the photosensitive assemblies 30 are both connected by the multi-lens camera module conjoined stand 10, the distances between the optical lenses 21 of the lens assemblies 20 and the sensors 31 of the photosensitive assemblies 30 can be adjusted. For example, each of the optical lenses 21 can be driven by the corresponding driving motor 22 so as to move along the path of photoreception of the corresponding photosensitive sensor 31, such that the focal length of the dual-lens camera module can be adjusted through the shift between the optical lens 21 and the photosensitive side of the photosensitive sensor 31. It is understandable that according to a preferred implementation of the present invention, the relative positions of the lens assemblies 20 and the photosensitive assemblies 30 can be synchronously adjusted. Nonetheless, according to another preferred implementation of the present invention, the relative positions of the lens assemblies 20 and the photosensitive assemblies 30 can respectively be independently adjusted.

The stand bodies 12 of the multi-lens camera module conjoined stand 10 are integrally extended from two side portions of the connecting body 11 respectively. Each stand body 12 is utilized to connect one of the lens assemblies 20 and one of the photosensitive assemblies 30, so as to form the dual-lens camera module. The specification of the stand bodies 12 may not be limited. For instance, in one embodiment, the sizes of the stand bodies 12 can be different. For another preferred implementation of the present invention, the specifications of the stand bodies 12, including the dimensions, are all the same, which means the stand bodies 12 can be symmetrically extended to both sides of the connecting body 11.

Further, each stand body 12 has a light channel 121 to communicate the upside 101 and the downside 102 of the multi-lens camera module conjoined stand 10. Each lens assembly 20 and each photosensitive assembly 30 of the dual-lens camera module can interact through the respective light channel 121 of each of the stand bodies 12. In other words, when the dual-lens camera module is shooting image, light can successively pass through the optical lenses 21 of the lens assemblies and the light channels 121 and be received by the photosensitive sides of the photosensitive sensors 31 of the photosensitive assemblies 30 for photoelectric conversion. It is worth mentioning that the light channel 121 is arranged in the central position of each of the stand bodies 12.

Each stand body 12 can further comprise a loading portion 122, a connecting portion 123 and an attaching portion 124, which are integrated or integrally formed. The light channel 121 is arranged in the loading portion 122. It is understandable that the loading portion 122 is at the inner side of the stand body 12, the attaching portion 124 is at the outer side of the stand body 12, and the connecting portion 123 is for connecting the loading portion 122 and the attaching portion 124. In other words, the loading portion 122, the connecting portion 123 and the attaching portion 124 are arranged on the stand body 12 along an internal to external manner.

A thickness dimension of the loading portion 122 is smaller than the thickness dimension of the connecting portion 123 along the direction of the path of photoreception of the respective photosensitive sensor 31, such that the stand body 12 can form a stair 1221 at the place corresponding to the loading portion 122. The dual-lens camera module also comprises at least two filtering elements 40 arranged on the stairs 1221 formed by the loading portions 122 to be supported by the loading portions 122 respectively. It is worth mentioning that the position of the stair 1221 formed by the loading portion 122 can be limited. For example, the stair 1221 formed by the loading portion 122 may be arranged on either the upside 101 of the multi-lens camera module conjoined stand 10 or the downside 102 of the multi-lens camera module conjoined stand 10.

The thickness dimension of the connecting portion 123 is also smaller than the thickness dimension of the attaching portion 124 along the direction of the path of photoreception of the photosensitive sensor 31, so as to respectively form a first packaging groove 125 and a second packaging groove 126 of the stand body 12 at a position corresponding to the connecting portion 123. The first packaging groove 125 is on the upside 101 of the multi-lens camera module conjoined stand 10, while the second packaging groove 126 is on the downside 102 of the multi-lens camera module conjoined stand 10. Person skilled in the art should understand that the first packaging groove 125 and the second packaging groove 126 are respectively communicated with the light channel 121. The lens assembly 20 can be corresponding to the first packaging groove 125 of the stand body 12 and sealed and packaged on the multi-lens camera module conjoined stand 10. The photosensitive assembly 30 can be corresponding to the second packaging groove 126 of the stand body 12 and sealed and packaged on the multi-lens camera module conjoined stand 10.

In particular, a side of the lens assembly 20 can be sealed and packaged on the stand body 12 corresponding to the first packaging groove 125. For instance, the side of the lens assembly 20 may comprise a guide pin arranged on the side and extended into the first packaging groove 125, so as to implement the sealing and packaging of the lens assembly 20 and the stand body 10. According to the preferred embodiment, the circuit board 32 of the photosensitive assembly 30 can be attached on the attaching portion 124 of the stand body 12, so as to seal and package the photosensitive sensor 31 of the circuit board 32 in the second packaging groove 126 of the stand body 12 and to arrange the optic axis of the optical lens 21 of the lens assembly 20 being perpendicular to the photosensitive side of the photosensitive sensor 31 of the photosensitive assembly 30. It is worth mentioning that, according to an alternative mode of the preferred embodiment of the present invention, the periphery of the sensor 31 of the photosensitive assembly 30 can be extended for being sealed and packaged on the attaching portion 124 directly. Besides, the photosensitive sensor 31 is positioned in the second packaging groove 126.

Person skilled in the art should understand that the multi-lens camera module conjoined stand 10 is an integral body. Contrasting to the prior art that two or more independent stands are connected to form a stand of the dual-lens camera module, the integral multi-lens camera module conjoined stand 10 of the present invention provides the following outstanding advantages.

Specifically, a first advantage of the multi-lens camera module conjoined stand 10 is that the multi-lens camera module conjoined stand 10 can overcome the technical defects of the independent stands of conventional dual-lens camera module, such as positional deviations and angle deviations between the independent stands when connecting the separate stands and etc., so as to avoid relative tilt between the paths of photoreception of the lens assemblies 20 and the photosensitive assemblies 30 after sealing and packaging.

A second advantage of the multi-lens camera module conjoined stand 10 is that when the dual-lens camera module of the present invention experiences severely shaken and vibration, the stand bodies 12 integrally extended from the connecting body 11 can retain and ensure the relative positions of the lens assemblies 20 and the photosensitive assemblies 30, such as the tilt, distance, and etc., among the lens assemblies 20 and the photosensitive assemblies 30.

A third advantage of the multi-lens camera module conjoined stand 10 is the thinner thickness thereof. The independent stands of the conventional art are connected by means of the circuit board. Therefore, in order to ensure the stability of the relative positions of the stands, a circuit board with certain thickness and rigidity is required for conventional multi-lens camera module. For example, the conventional dual-lens camera module can only utilize a PCB type circuit board that undoubtedly increases the thickness thereof. However, the circuit board 32 of the dual-lens camera module of the present invention does not need to have to connect the stands. Therefore, there is no necessary requirement to the thickness and hardness of the circuit board 32. For example, according to the present invention, the circuit board 32 can be a PCB type circuit board or a FPC circuit board with even thinner thickness. Furthermore, according to an alternative mode of the preferred embodiment of the present invention, the dual-lens camera module may even do not include the circuit board 32, but simply integrate the circuit into the photosensitive sensors 31, so as to greatly reduce the thickness of the dual-lens camera module in the direction of the path of photoreception of the photosensitive sensors 31, which allows the dual-lens camera module to be utilized on the electronic devices expected to be lighter and thinner.

Besides, person skilled in the art should understand that the conventional independent stands can only be connected through the circuit board, so a space has to be reserved between adjacent stands for accommodating the electronic components attached on the circuit board. Unfortunately, when the conventional dual-lens camera module is in use, the circuit board could be heated and deformed easily. Once the circuit board is deformed, the slopes of the independent stands will inevitably be changed, which will consequently impact the imaging quality of the conventional dual-lens camera module.

According to the preferred embodiment of the present invention, the connecting body 11 of the multi-lens camera module conjoined stand 10 further has an electronic component accommodating cavity 111 provided therein for accommodating and receiving one or more electronic components 321 attached on the circuit board 32. The electronic component accommodating cavity 111 of the connecting body 11 is impassable to the light channel 121, the first packaging groove 125 and the second packaging groove 126 of the stand body 12. After the circuit board 32 is attached on the multi-lens camera module conjoined stand 10 during the process of sealing and packaging the dual-lens camera module, the electronic component 321 is adapted to be sealed and packaged within the electronic component accommodating cavity 111 of the connecting body 11 alone, such that the pollutants, such as welding slags, dusts, and etc., will not enter the second packaging groove 126 of the stand body 12 to pollute the photosensitive side of the photosensitive sensor 31 of the photosensitive assembly 30 sealed and packaged in the second packaging groove 126 of the stand body 12, that avoids defective pixel from occurring on the photosensitive side of the sensor 31 so as to further increase the imaging quality of the dual-lens camera module.

Also, the electronic component accommodating cavity 111 of the connecting body 11 is formed in a gap adjacent to the stand bodies 12, which not only utilizes spare space of the dual-lens camera module, but also avoids being deformed easily due to the fact that the electronic component accommodating cavity 111 of the connecting body 11 prevents the stress of the multi-lens camera module conjoined stand 10 from concentrating because of the position of the connecting body 11, such that a stability of the multi-lens camera module conjoined stand in use is ensured.

As shown in the drawings, each of the stand bodies 12 of the multi-lens camera module conjoined stand 10 has a central axis and the distance between the central axes of the stand bodies 12 can be ranged 5 mm to 200 mm. Preferably, according to the preferred embodiment, the distance between the central axes of the stand bodies 12 can be 9 mm. In addition, the alignment between the central axes of the stand bodies 12 is parallel or perpendicular to each fringe of the multi-lens camera module conjoined stand 10, so that when the dual-lens camera module assembled with the multi-lens camera module conjoined stand 10, the lens assemblies 20 and the photosensitive assemblies 30 is installed in the electronic device, the path of photoreception of each of the lens assemblies 20 and each of the photosensitive assemblies 30 can be controlled more easily.

There are essential differences between the dual-lens camera module of the present invention and the conventional dual-lens camera module in view of structures, technical effects, or etc. The conventional dual-lens camera module needs to affix two independent stands on the circuit board but, based on its assembling process, the distance between the central axes of the two independent stands of the conventional dual-lens camera module is very difficult to be controlled, which renders a poor consistency of the dual-lens camera module according to conventional art. From a structural perspective, the two independent stands of the conventional dual-lens camera module are only affixed by the circuit board. In other words, the conventional dual-lens camera module depends on the circuit board for symmetrically securing two independent stands on the circuit board. During the application of the conventional dual-lens camera module, once distortion occurs on the circuit board, the positional relation between the two independent stands will inevitably be changed, which will render deadly impact to the imaging quality of the conventional dual-lens camera module. Moreover, the circuit board of the conventional dual-lens camera module is PCB in practical application, which is insufficient to support two or more independent stands, two or more lens assemblies, and two or more photosensitive assemblies. Also, PCB type circuit board can easily be deformed under heat. Besides, more and more lens assemblies and photosensitive assemblies are demanded in the multi-lens camera module, whereas the structure of conventional stand is more inadequate in making a multi-lens camera module that has more than two stands, two lens assemblies, and two photosensitive assemblies.

According to a preferred implementation of the present invention, the multi-lens camera module conjoined stand 10 can be integrally formed by thermoplastic resin material that reinforces the stability of the multi-lens camera module conjoined stand 10. According to an alternative mode of the preferred implementation of the present invention, the multi-lens camera module conjoined stand 10 may also be integrally formed by engineering plastics, wherein the material formed by engineering plastics particles can be poured into the mold to produce the multi-lens camera module conjoined stand 10. Specifically speaking, the material of the multi-lens camera module conjoined stand 10 may be "ishiNTB982" engineering plastics, Liquid Crystal Polymer (LCP) engineering plastics, or etc. Besides, the multi-lens camera module conjoined stand 10 can also be made of metallic material or alloy material, so as to not only guarantee the intensity of the multi-lens camera module conjoined stand 10, but also enhance the heat dissipation of the multi-lens camera module conjoined stand 10. Specifically, the multi-lens camera module conjoined stand 10 can be integrally formed by metal powder or mixture of metal powder and nonmetal powder through injection molding technology or 3D printing technology. For instance, the material of the multi-lens camera module conjoined stand 10 can be aluminum alloy, zinc alloy, or etc.

It is worth mentioning that, in contrasting with the conventional dual-lens camera module, the multi-lens camera module conjoined stand 10 of the present invention provides a new thought of heat dissipation for the dual-lens camera module. That is, the present invention utilizes the multi-lens camera module conjoined stand 20 arranged on the circumferential of the photosensitive sensors 31 of the photosensitive assemblies 30 to implement heat dissipation. Firstly, the multi-lens camera module conjoined stand 10 has a bigger radiating surface that can increase the heat dissipation performance of the dual-lens camera module. Secondly, none or only a small portion of the heat generated by the photosensitive sensors 31 of the photosensitive assemblies 30 has to be dissipated through the circuit board 32. Therefore, the circuit board 32 is not likely to be deformed due to high temperature and there is no need to attach radiating fin on the outer side of the circuit board 32 as a heat dissipation aid, such that the thickness of the dual-lens camera module in the direction of the path of photoreception can further be reduced, which makes the dual-lens camera module especially suitable for the electronic devices expected to be lighter and thinner.

Figure 6:
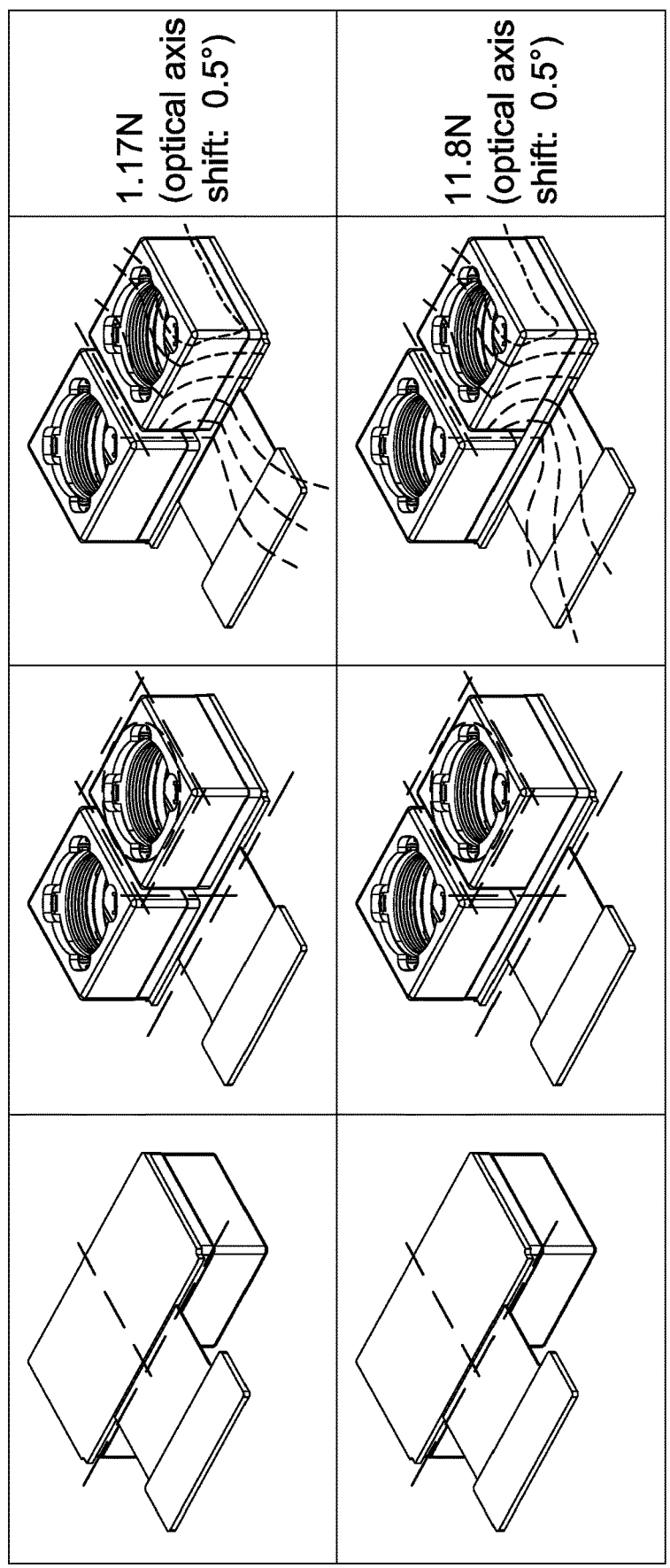
FIG. 6 is a comparison diagram of the rigid strength simulation of a conventional dual-lens camera module and the multi-lens camera module according to the present invention under stress.

FIG. 6 is a comparison diagram of the rigid strength simulation of a conventional dual-lens camera module and the dual-lens camera module according to the present invention under stress. Person skilled in the art should understand that, in contrasting with the independent stands of the conventional dual-lens camera module that rely on wire bonding, the multi-lens camera module conjoined stand 10 of the dual-lens camera module of the present invention utilizes an integral structure, which significantly strengthens the rigidity thereof. By testing the overall rigidity of the conventional dual-lens camera module and the dual-lens camera module of the present invention under stress, person skilled in the art would appreciate that it takes significantly greater external force to apply on the dual-lens camera module of the present invention than the conventional dual-lens camera module in order to trigger the same distortion thereon. For instance, referring to FIG. 6, it respectively changes the angle of the optic axes of the conventional dual-lens camera module and the multi-lens camera module of the present invention for 0.5°. During the testing, it applies external force to the stands of the right in FIG. 6 so as to change the angle of the optic axes of the lens assemblies supported thereby. Therefore, the degree of distortion will gradually be greater for the position more to the right side of the independent stands and less for the position more to the left side of the independent stands. The test results indicate that the required external force to apply on the conventional dual-lens camera module for changing the angle of its optic axis for 0.5° is 1.17 N, while the required external force to apply on the dual-lens camera module of the present invention for changing the angle of its optic axis for 0.5° is 11.8 N. Hence, the test results have revealed that the overall rigidity of the dual-lens camera module of the present invention is far greater than the overall rigidity of the conventional dual-lens camera module, which means the dual-lens camera module of the present invention is more stable.

Person skilled in the art should understand that the multi-lens camera module being embodied as the dual-lens camera module in the above description of the present invention is just an example for describing and illustrating the content and scope of the present invention. Practically, the multi-lens camera module conjoined stand 10 may also provide three or more stand bodies 12, so as to implement the multi-lens camera module beyond the dual-lens camera module, where the multi-lens camera module, for example, may be embodied as a tri-lens camera module, tetra-lens camera module, and etc. This is beyond the expectation of the dual-lens camera module of prior art and the structure of the conventional dual-lens camera module is not able to provide any technical inspiration on the multi-lens camera module of the present invention. Hence, the multi-lens camera module of the present invention has significant non-obviousness.

Figure 7:
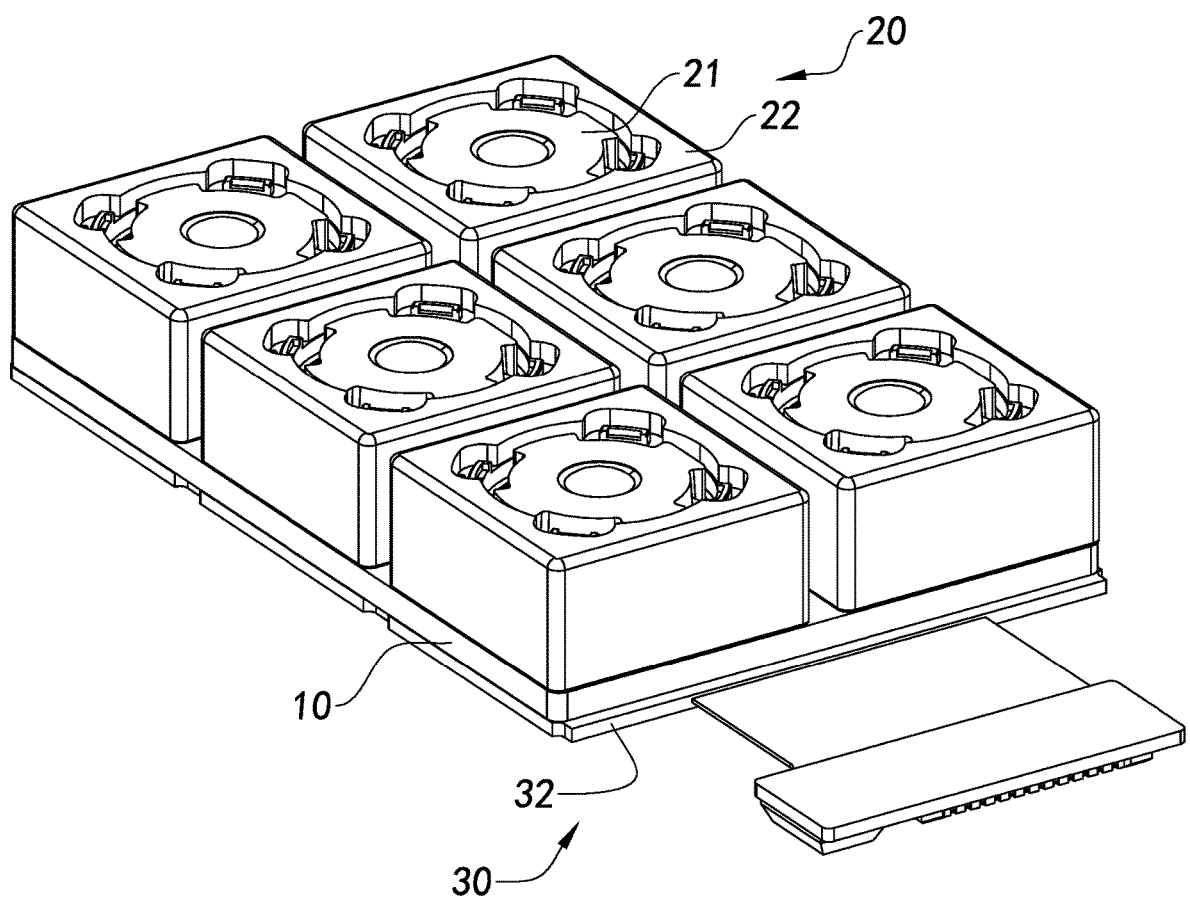
FIG. 7 is a perspective view of an alternative mode of the multi-lens camera module according to the preferred embodiment of the present invention.
Figure 8:
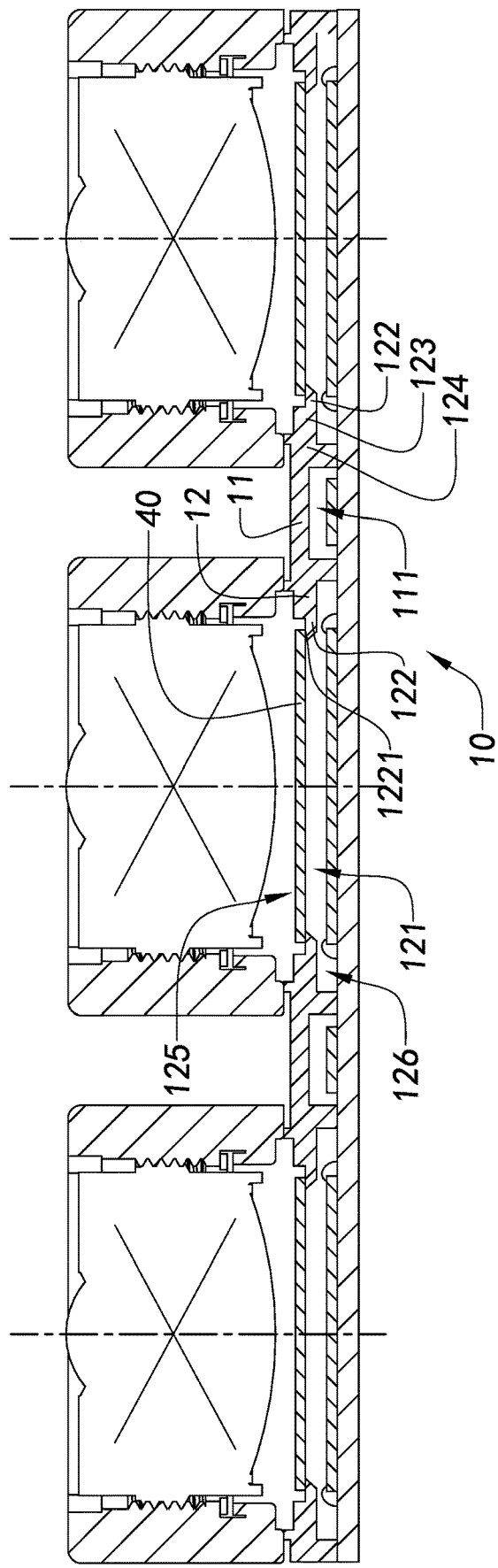
FIG. 8 is a sectional view of the alternative mode of the multi-lens camera module according to the preferred embodiment of the present invention.
Figure 9:
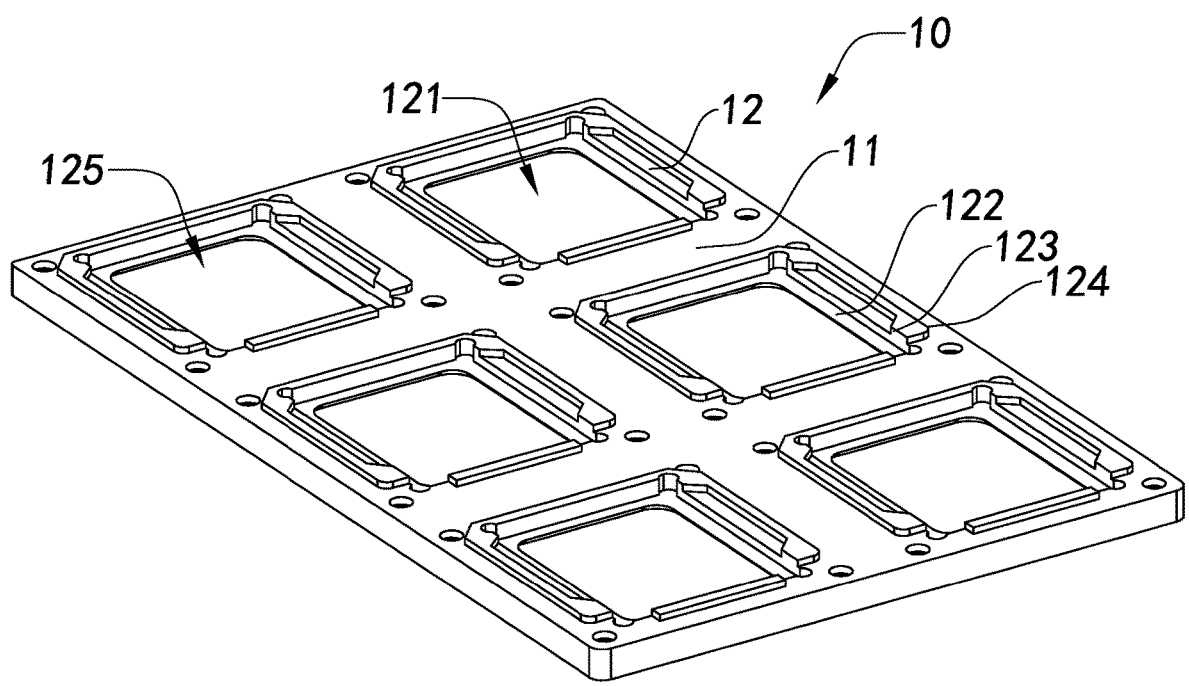
FIG. 9 is a perspective view of the alternative mode of the multi-lens camera module conjoined stand of the multi-lens camera module according to the preferred embodiment of the present invention.

According to the alternative modes of the preferred embodiment as illustrated in FIGS. 7-9, the multi-lens camera module can comprise one integrated multi-lens camera module conjoined stand 10, six the lens assemblies 20 and six the photosensitive assemblies 30, wherein the multi-lens camera module conjoined stand 10 provides six stand bodies 12, where each one of the stand bodies 12 is utilized to support one of the lens assemblies 20 and one of the photosensitive assemblies 30 so as to form the multi-lens camera module. It is worth mentioning that the correspondingly aligned lens assemblies 20 and photosensitive assemblies 30 are arranged into an array manner, where the multi-lens camera module forming an array camera module.

It is worth mentioning that, referring to FIG. 10, the present invention also provides a method for avoiding the lens assemblies 20 and the photosensitive assemblies 30 of the multi-lens camera module from deviation, wherein the method comprises the following steps:

(a) integrally forming a multi-lens camera module conjoined stand 10; and (b) connecting the lens assemblies 20 on upside and the photosensitive assembly 30 on the downside of the multi-lens camera module conjoined stand 10, wherein the lens assemblies 20 are located along the paths of photoreception of the photosensitive assemblies 30 respectively.

Those skilled in the art shall understand that the above mentioned embodiments of the present invention in the descriptions and figures are exemplary only and not intended to be limiting.

Accordingly, objectives of the present invention are completely and effectively implemented. Notions of the functions and structures of the present invention have been shown and described in the embodiments, while the present invention shall not be limited to the change of the basis of the notions of the embodiments. Hence, the present invention includes all modifications or changes covered by the claimed scope and the spirit thereof.

What is claimed is:

1. A multi-lens camera module, comprising:
   at least two lens assemblies;
   at least two photosensitive assemblies; and
   an integrated multi-lens camera module conjoined stand having an upside and a downside, wherein said lens assemblies are connected with said upside of said multi-lens camera module conjoined stand and said photosensitive assemblies are connected with said downside of said multi-lens camera module conjoined stand, wherein said lens assemblies are located along paths of photoreception of said photosensitive assemblies respectively;

wherein said multi-lens camera module conjoined stand comprises at least a connecting body and at least two stand bodies, wherein each of said stand bodies is extended from at least one said connecting body, and wherein each of said stand bodies supports one of said lens assemblies and one of said photosensitive assemblies;

wherein an electronic component accommodation cavity is provided in the connecting body at a position of a gap adjacent to the two stand bodies extended from the connecting body; and wherein each of said photosensitive assemblies comprises a photosensitive sensor and a circuit board, each of said photosensitive sensors is electrically connected with said circuit board, and said circuit board comprises at least an electronic component, said circuit board is adaptable for being attached on said downside of said multi-lens camera module conjoined stand, and said electronic component is packaged and sealed in said electronic component accommodation cavity.

2. The multi-lens camera module, as recited in claim 1, wherein each of said stand bodies has a light channel, a first packaging groove and a second packaging groove communicated with said light channel, wherein said lens assemblies are positioned corresponding to said first packaging grooves respectively and connected with said upside of said multi-lens camera module conjoined stand, wherein said photosensitive assemblies are positioned corresponding to said second packaging grooves respectively and connected with said downside of said multi-lens camera module conjoined stand.

3. The multi-lens camera module, as recited in claim 2, wherein said connecting body comprises a connecting portion and an attaching portion, wherein said attaching portion is extended from said stand body and said connecting portion is extended from an inner side of said attaching portion, wherein a thickness dimension of said connecting portion is smaller than a thickness dimension of said attaching portion, so as to form said first packaging groove and said second packaging groove on two side portions of said connecting portion respectively along a thickness direction of said multi-lens camera module.

4. The multi-lens camera module, as recited in claim 3, wherein each of said stand bodies comprises a loading portion extended from an inner side of said connecting portion, wherein said loading portion defines said light channel, wherein a thickness dimension of said loading portion is smaller than a thickness dimension of said connecting portion so as to form a stair on a side of said connecting portion along the thickness direction of said multi-lens camera module.

5. The multi-lens camera module, as recited in claim 4, further comprising at least two filtering elements arranged on said stairs formed by said loading portions respectively.

6. The multi-lens camera module, as recited in claim 4, wherein said stairs and said first packaging grooves are provided on the same side of the multi-lens camera module conjoined stand.

7. The multi-lens camera module, as recited in claim 4, wherein said stairs and said second packaging grooves are provided on the same side of the multi-lens camera module conjoined stand.

8. The multi-lens camera module, as recited in claim 4, wherein said electronic component accommodation cavity is impassable to said first packaging groove, and said photosensitive sensors are packaged and sealed in said second packaging grooves respectively.

9. The multi-lens camera module, as recited in claim 8, wherein said electronic component accommodating cavity and said second packaging grooves are on the same side of the multi-lens camera module conjoined stand.

10. The multi-lens camera module, as recited in claim 8, wherein said circuit board is selected from the group consisting of a PCB type circuit board and a FPC type circuit board.

11. The multi-lens camera module, as recited in claim 4, wherein an alignment of central axes of said stand bodies is parallel to a peripheral of said multi-lens camera module conjoined stand.

12. The multi-lens camera module, as recited in claim 4, wherein a distance between central axes of said stand bodies is 5 mm-200 mm.

13. The multi-lens camera module, as recited in claim 12, wherein said distance between said central axes of said stand bodies is 9 mm.

14. The multi-lens camera module, as recited in claim 4, wherein a material of said multi-lens camera module conjoined stand is selected from the group consisting of thermoplastic resin, engineering plastics, metal, and alloy.

15. The multi-lens camera module, as recited in claim 4, wherein a material of said multi-lens camera module conjoined stand is selected from the group consisting of aluminum alloy and zinc alloy.

16. The multi-lens camera module, as recited in claim 4, wherein a material of said multi-lens camera module conjoined stand is selected from the group consisting of metal powder and mixture of metal powder and nonmetal powder.

17. A multi-lens camera module conjoined stand for connecting with at least two lens assemblies and at least two photosensitive assemblies, said multi-lens camera module conjoined stand comprising
at least a connecting body and at least two stand bodies, wherein each of said stand bodies is extended from said at least one connecting body, and wherein each of said stand bodies supports one of said lens assemblies at an upside and one of said photosensitive assemblies at a downside;
wherein an electronic component accommodation cavity is provided in the connecting body at a position of a gap adjacent to the two stand bodies extended from the connecting body;
wherein each of said photosensitive assemblies comprises a photosensitive sensor and a circuit board, each of said photosensitive sensors is electrically connected with said circuit board, and said circuit board comprises at least an electronic component, said circuit board is adaptable for being attached on said downside of said multi-lens camera module conjoined stand, and said electronic component is packaged and sealed in said electronic component accommodation cavity; and
wherein said multi-lens camera module conjoined stand is integrally formed as an integral body.

18. The multi-lens camera module conjoined stand, as recited in claim 17, wherein each of said stand bodies has a light channel, a first packaging groove and a second packaging groove communicated with said light channel, wherein said lens assemblies are positioned corresponding to said first packaging grooves respectively and connected with said upside of said multi-lens camera module conjoined stand, wherein said photosensitive assemblies are positioned corresponding to said second packaging grooves respectively and connected with said downside of said multi-lens camera module conjoined stand.

19. The multi-lens camera module conjoined stand, as recited in claim 18, wherein each of said stand bodies comprises an attaching portion, a connecting portion and a loading portion, wherein said attaching portions are extended from said connecting bodies respectively, wherein said connecting portions are respectively connected with said attaching portions and said loading portions, wherein each of said loading portions comprises a light channel therein.

20. The multi-lens camera module conjoined stand, as recited in claim 19, wherein a thickness dimension of each of said loading portions is smaller than a thickness dimension of each of said connecting portions so as to form a stair on a side of each of said connecting portions along a thickness direction of said multi-lens camera module conjoined stand.

21. The multi-lens camera module conjoined stand, as recited in claim 19, wherein the thickness dimension of each of said connecting portions is smaller than a thickness dimension of each of said attaching portions so as to form a first packaging groove and a second packaging groove on two side portions of each of said connecting portions respectively along a thickness direction of said multi-lens camera module conjoined stand, wherein said first packaging grooves and said second packaging grooves are communicated with said light channels respectively.

22. The multi-lens camera module conjoined stand, as recited in claim 21, wherein a distance between central axes of said stand bodies is 5 mm-200 mm.

23. The multi-lens camera module conjoined stand, as recited in claim 21, wherein a material of said multi-lens camera module conjoined stand is selected from the group consisting of thermoplastic resin, engineering plastics, metal, and alloy.

24. The multi-lens camera module conjoined stand, as recited in claim 21, wherein an alignment of central axes of said stand bodies is parallel to a peripheral of said multi-lens camera module conjoined stand.

25. A method for avoiding at least two lens assemblies and at least two photosensitive assemblies of a multi-lens camera module from deviation, wherein the method comprises the steps of:
(a) integrally forming a multi-lens camera module conjoined stand; and
(b) connecting the at least two lens assemblies with an upside of said multi-lens camera module conjoined stand and the at least two photosensitive assemblies with a downside of said multi-lens camera module conjoined stand, wherein said lens assemblies are located along paths of photoreception of said photosensitive assemblies respectively;
wherein said multi-lens camera module conjoined stand comprises at least one connecting body and at least two stand bodies, wherein each of said stand bodies is extended from said at least one connecting body, and wherein each of said stand bodies supports one of said at least two lens assemblies and one of said at least two photosensitive assemblies;
wherein an electronic component accommodation cavity is provided in the connecting body at a position of a gap adjacent to the two stand bodies extended from the connecting body; and
wherein each of said photosensitive assemblies comprises a photosensitive sensor and a circuit board, each of said photosensitive sensors is electrically connected with said circuit board, and said circuit board comprises at least an electronic component, said circuit board is adaptable for being attached on said downside of said multi-lens camera module conjoined stand, and said electronic component is packaged and sealed in said electronic component accommodation cavity.

26. The method, as recited in claim 25, wherein each of said stand bodies has a light channel, a first packaging groove and a second packaging groove communicated with said light channel, wherein said lens assemblies are positioned corresponding to said first packaging grooves respectively and connected with said upside of said multi-lens camera module conjoined stand, wherein said photosensitive assemblies are positioned corresponding to said second packaging grooves respectively and connected with said downside of said multi-lens camera module conjoined stand.

* * * * *